(12) United States Patent
Pan et al.

(10) Patent No.: US 11,375,095 B1
(45) Date of Patent: Jun. 28, 2022

(54) IMAGE CAPTURING DEVICE

(71) Applicant: Quanta Computer Inc., Taoyuan (TW)

(72) Inventors: Chun-Hao Pan, Taoyuan (TW);
Wen-Shu Lee, Taoyuan (TW)

(73) Assignee: QUANTA COMPUTER INC.,
Taoyuan (TW)

( * ) Notice: Subject to any disclaimer, the term of this patent is extended or adjusted under 35 U.S.C. 154(b) by 0 days.

(21) Appl. No.: 17/205,178

(22) Filed: Mar. 18, 2021

(30) Foreign Application Priority Data

Dec. 24, 2020 (TW) .................................. 109217027

(51) Int. Cl.
*H04N 5/225* (2006.01)
*B60R 1/02* (2006.01)
*G03B 17/08* (2021.01)
*G02B 7/02* (2021.01)

(52) U.S. Cl.
CPC .............. *H04N 5/2257* (2013.01); *B60R 1/02* (2013.01); *G03B 17/08* (2013.01); *H04N 5/2252* (2013.01); *G02B 7/02* (2013.01)

(58) Field of Classification Search
CPC ...... H04N 5/2257; H04N 5/2252; B60R 1/02; G03B 17/08; G02B 7/02
See application file for complete search history.

(56) References Cited

U.S. PATENT DOCUMENTS

| 2003/0030748 | A1* | 2/2003 | Jung ................ G08B 13/19632 |
| | | | 348/E5.026 |
| 2012/0075519 | A1* | 3/2012 | Blasch ................. H04N 5/2254 |
| | | | 348/340 |
| 2016/0112607 | A1* | 4/2016 | Yang .................... H04N 5/2253 |
| | | | 348/373 |
| 2017/0320449 | A1* | 11/2017 | Park ..................... H04N 5/2253 |
| 2018/0262661 | A1* | 9/2018 | Amano .................. A61B 1/042 |

* cited by examiner

*Primary Examiner* — Amy R Hsu
(74) *Attorney, Agent, or Firm* — McClure, Qualey & Rodack, LLP

(57) ABSTRACT

An image capturing device is provided. The image capturing device includes a base, a cable, a restriction bushing and a sealing material. The base includes a base through hole and a base inner surface, wherein the base through hole is formed on the base inner surface. The cable passes through the base through hole. The restriction bushing surrounds the cable, wherein the restriction bushing abuts the base inner surface, and is connected to the base through hole. The sealing material is disposed in the base and covers the restriction bushing, wherein at least a portion of the cable is covered by the sealing material.

8 Claims, 6 Drawing Sheets

IMAGE CAPTURING DEVICE

CROSS REFERENCE TO RELATED APPLICATIONS

This application claims priority of Taiwan Patent Application No. 109217027, filed on Dec. 24, 2020, the entirety of which is incorporated by reference herein.

BACKGROUND OF THE INVENTION

Field of the Invention

The present invention relates to an image capturing device, and in particular to an image capturing device with a cable.

Description of the Related Art

Image capturing devices can be disposed in many different kinds of mounting environments. For example, an image capturing device may be mounted in the rearview mirror of a motor vehicle. A conventional image capturing device has a base and a cable. The cable passes through the base and extends into the image capturing device. To prevent the cable from being broken or separated from the base, a cable fastening mechanism is disposed on the outside of the base to affix the cable. However, the space inside the rear mirror is limited, the cable fastening mechanism increases the size of the conventional image capturing device, and the conventional image capturing device therefore cannot be mounted in the rearview mirror.

BRIEF SUMMARY OF THE INVENTION

Embodiments of the invention are provided to address the aforementioned difficulty.

In one embodiment, an image capturing device is provided. The image capturing device includes a base, a cable, a restriction bushing and a sealing material. The base includes a base through hole and a base inner surface, wherein the base through hole is formed on the base inner surface. The cable passes through the base through hole. The restriction bushing surrounds the cable, wherein the restriction bushing abuts the base inner surface, and is connected to the base through hole. The sealing material is disposed in the base and covers the restriction bushing, wherein at least a portion of the cable is covered by the sealing material.

In one embodiment, the restriction bushing comprises a bushing flange, and the bushing flange abuts the base inner surface.

In one embodiment, the restriction bushing comprises a plurality of bushing ribs, and the bushing ribs are fitted tightly with an inner wall of the base through hole.

In one embodiment, the base comprises a first annular wall, the first annular wall is formed on the base inner surface, the first annular wall surrounds the restriction bushing, the first annular wall defines a sealing recess, and the sealing material is filled into the sealing recess defined by the first annular wall.

In one embodiment, the first annular wall comprising a plurality of restriction notches, the cable comprises a plurality of wires, and the wires are respectively restricted by the restriction notches.

In one embodiment, the base comprises a second annular wall, the second annular wall surrounds the first annular wall, and a spacing recess is formed between the first annular wall and the second annular wall.

In one embodiment, the first annular wall has a first height, the second annular wall has a second height, and the second height is greater than the first height.

In one embodiment, the first annular wall comprises a spacer section, the restriction notches are formed on the spacer section, and two ends of the spacer section are connected to the second annular wall.

In one embodiment, an extending recess is formed between the spacer section and the second annular wall, the extending recess is held apart from the spacing recess by the spacer section, the sealing material extends from the sealing recess into the extending recess, and the sealing material covers the restriction notches and at least a portion of the wires.

In one embodiment, the image capturing device further comprises a housing, a sealing ring and a lens, wherein the lens is connected to the housing, the housing comprises a connection rib, the base further comprises a connection groove, the connection groove surrounds the second annular wall, the sealing ring is disposed in the connection groove, and the connection rib is inserted into the connection groove.

In one embodiment, the assembling process of the image capturing device includes the following steps. First, the restriction bushing is formed on the cable by injection molding. Then, the restriction bushing is tightly fitted to the base, and provides waterproof and dust-proof function (the first waterproof and dust-proof means). Next, the wires are restricted by the restriction notches to prevent air gap from being generated during the sealing material filling step. Then, the sealing material is filled to the base by the assistance of the mold. The sealing material provides waterproof and dust-proof function (the second waterproof and dust-proof means). In one embodiment, the curing condition of the sealing material is 40 min/50° C. The disclosure is not meant to restrict the invention.

In the image capturing device of the embodiment of the invention, the cable and the restriction bushing are affixed to the base. The restriction bushing is disposed on the inner side of the base. Compared to the conventional art, the size of the image capturing device is decreased. The image capturing device can be mounted to the environment with limited mounting space (for example, in the rear mirror of the vehicle). The sealing material further affixes the cable and the restriction bushing to prevent the cable and the restriction bushing from being separated from the base, and provides waterproof and dust-proof effects.

In the image capturing device of the embodiment of the invention, the usage of the conventional combination means (such and bolts and glue) is reduced. The housing of the embodiment of the invention can be separated from the base by external force, and the image capturing device can be reworked easily.

A detailed description is given in the following embodiments with reference to the accompanying drawings.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
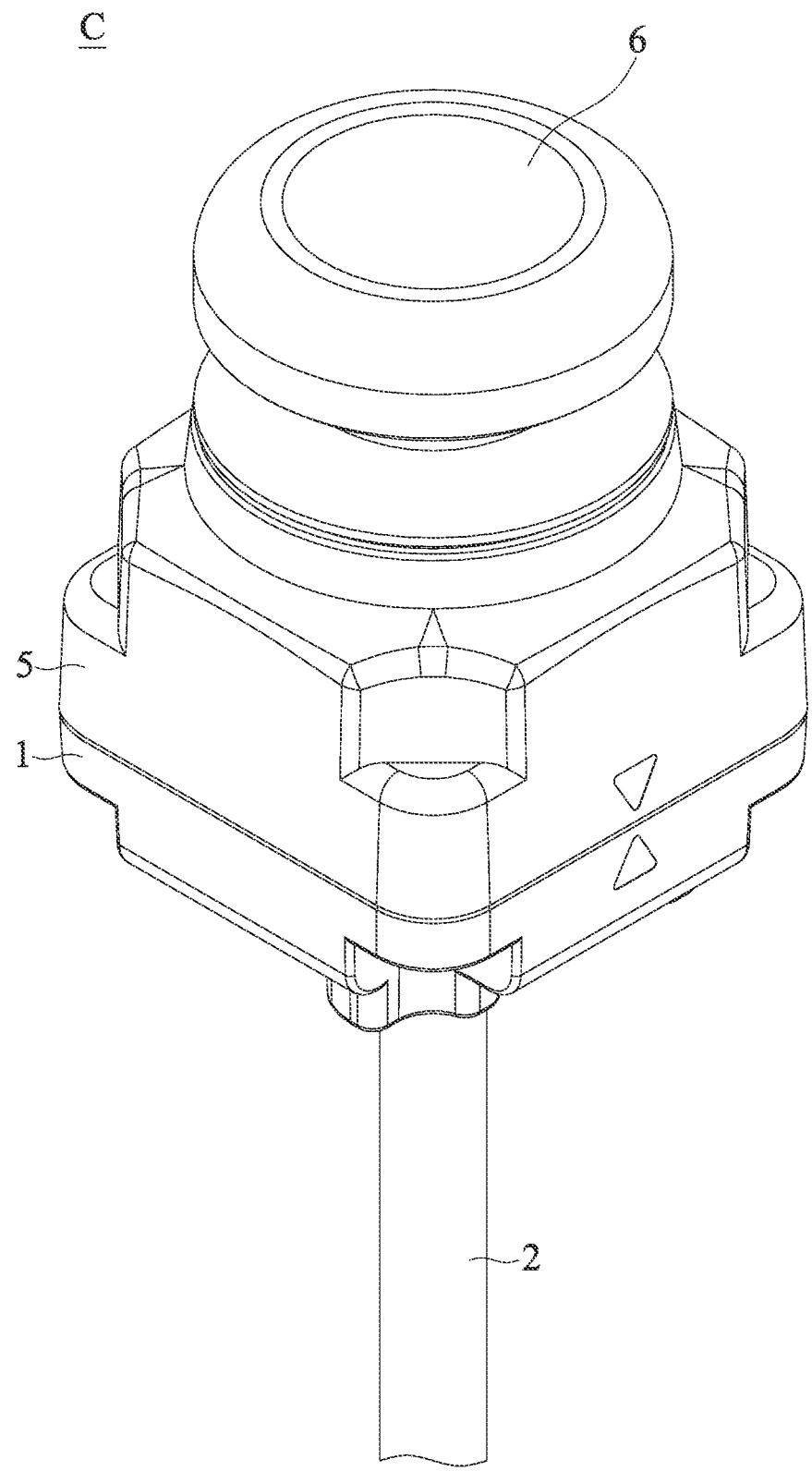
FIG. 1 is a perspective view of an image capturing device of an embodiment of the invention.
Figure 2:
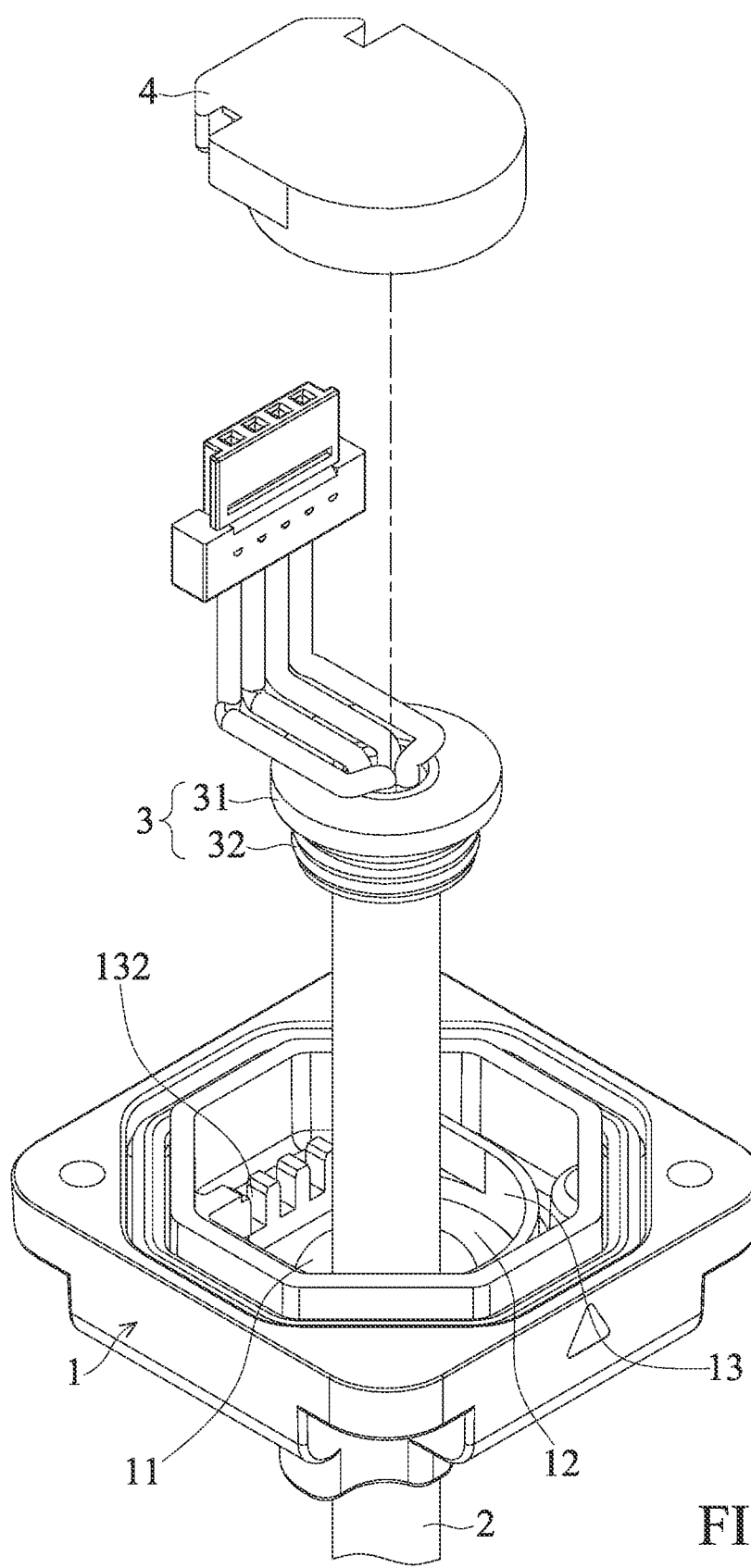
FIG. 2 is an exploded view of the major structure of the image capturing device of the embodiment of the invention.
Figure 3:
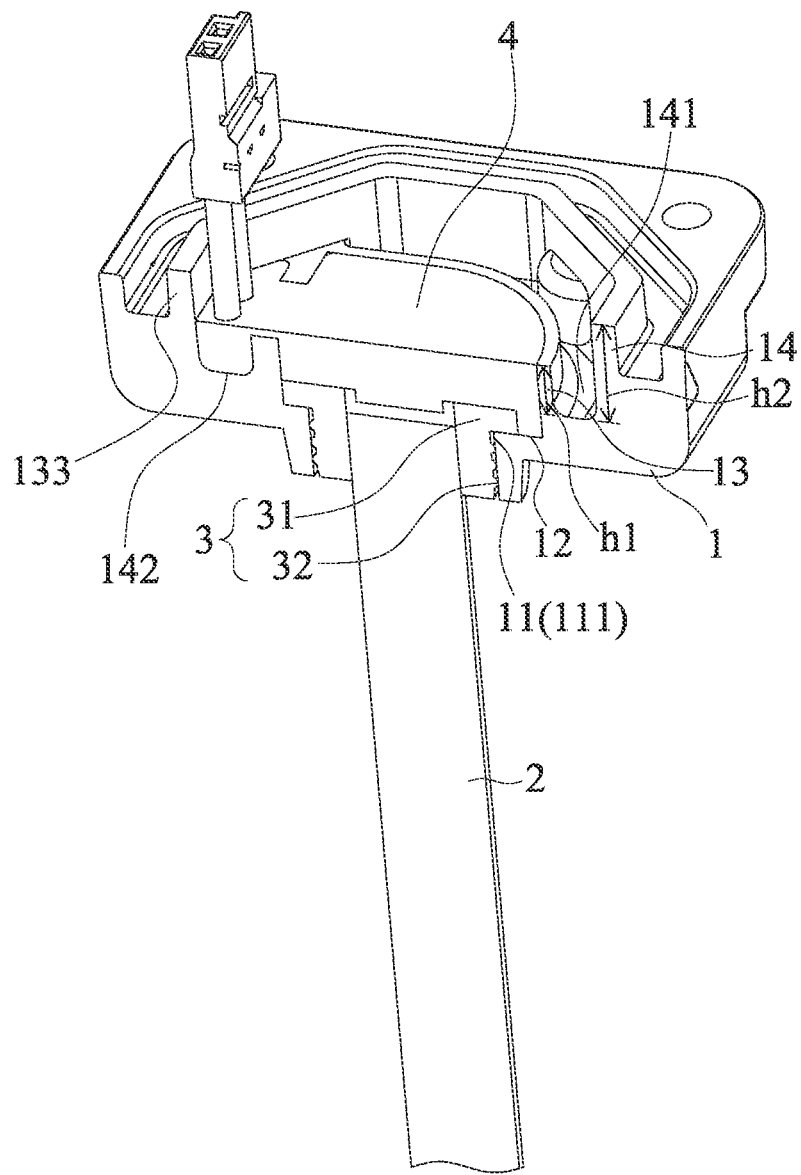
FIG. 3 is a cross-sectional view of the major structure of the image capturing device of the embodiment of the invention.

FIG. 1 is a perspective view of an image capturing device of an embodiment of the invention. FIG. 2 is an exploded view of the major structure of the image capturing device of the embodiment of the invention. FIG. 3 is a cross-sectional view of the major structure of the image capturing device of the embodiment of the invention. With reference to FIGS. 1, 2 and 3, in one embodiment, an image capturing device C is provided. The image capturing device C includes a base 1, a cable 2, a restriction bushing 3 and a sealing material 4. The base 1 includes a base through hole 11 and a base inner surface 12. The base through hole 11 is formed on the base inner surface 12. The cable 2 passes through the base through hole 11 of the base 1. The restriction bushing 3 surrounds the cable 2. The restriction bushing 3 abuts the base inner surface 12, and is connected to the base through hole 11. The sealing material 4 is disposed in the base 1 and covers the restriction bushing 3. At least a portion of the cable 2 is covered by the sealing material 4.

With reference to FIGS. 2 and 3, in one embodiment, the restriction bushing 3 comprises a bushing flange 31. The bushing flange 31 abuts the base inner surface 12. When the cable 2 is being pulled, the bushing flange 31 abuts the base inner surface 12 to prevent the restriction bushing 3 and the cable 2 from being separated from the base 1.

In one embodiment, the restriction bushing 3 can be made of thermoplastic polyurethanes. The restriction bushing 3 can be formed on the cable 2 by injection Molding. The disclosure is not meant to restrict the invention.

With reference to FIGS. 2 and 3, in one embodiment, the restriction bushing 3 comprises a plurality of bushing ribs 32. The bushing ribs 32 are fitted tightly with an inner wall 111 of the base through hole 11. Thus, the restriction bushing 3 can be firmly connected to the base 1, and provides waterproof function. The disclosure is not meant to restrict the invention. In other embodiment, the restriction bushing 3 can be connected to the base 1 by wedging or thread.

Figure 4A:
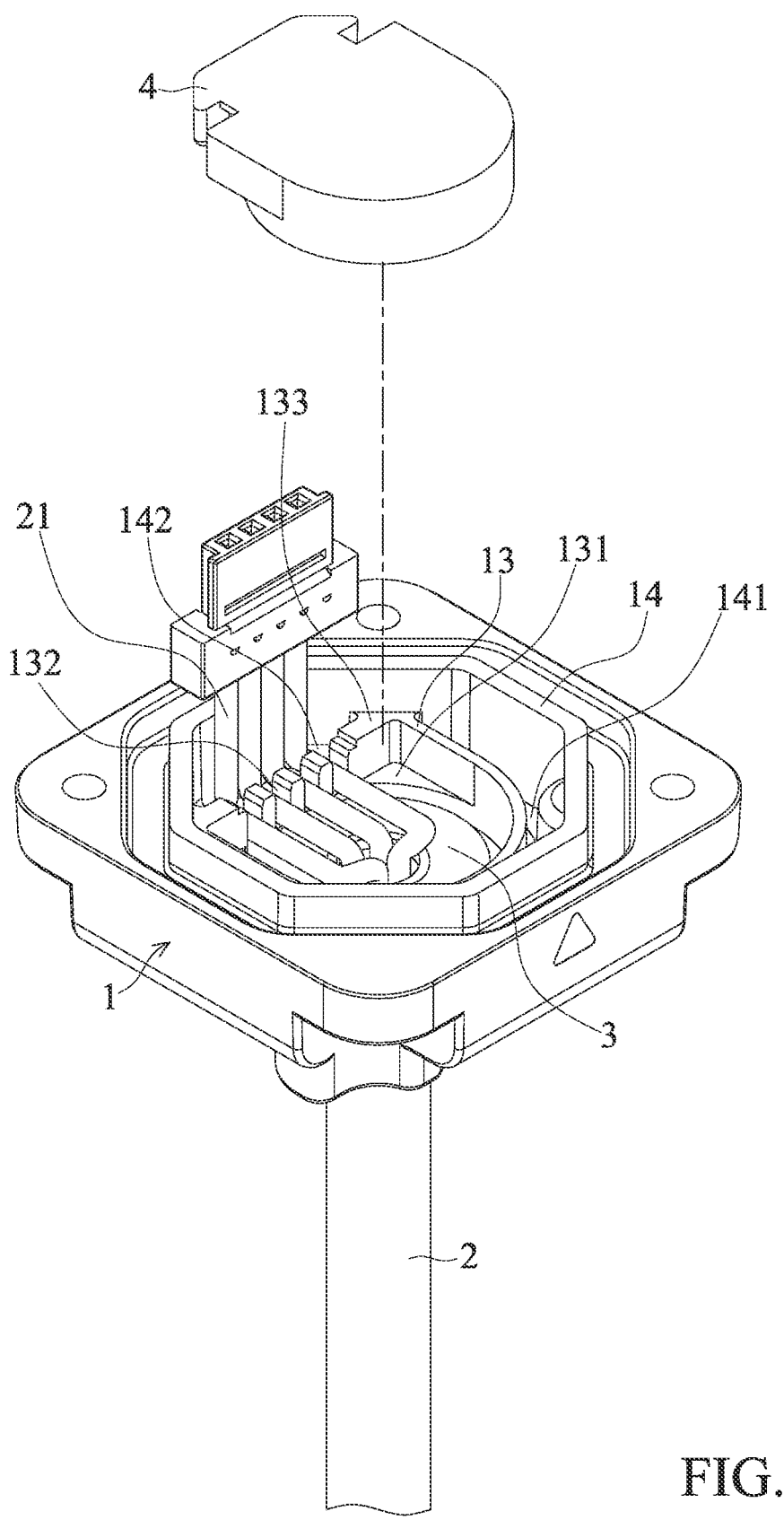
FIG. 4A shows the restriction bushing of the embodiment of the invention combined with the base.
Figure 4B:
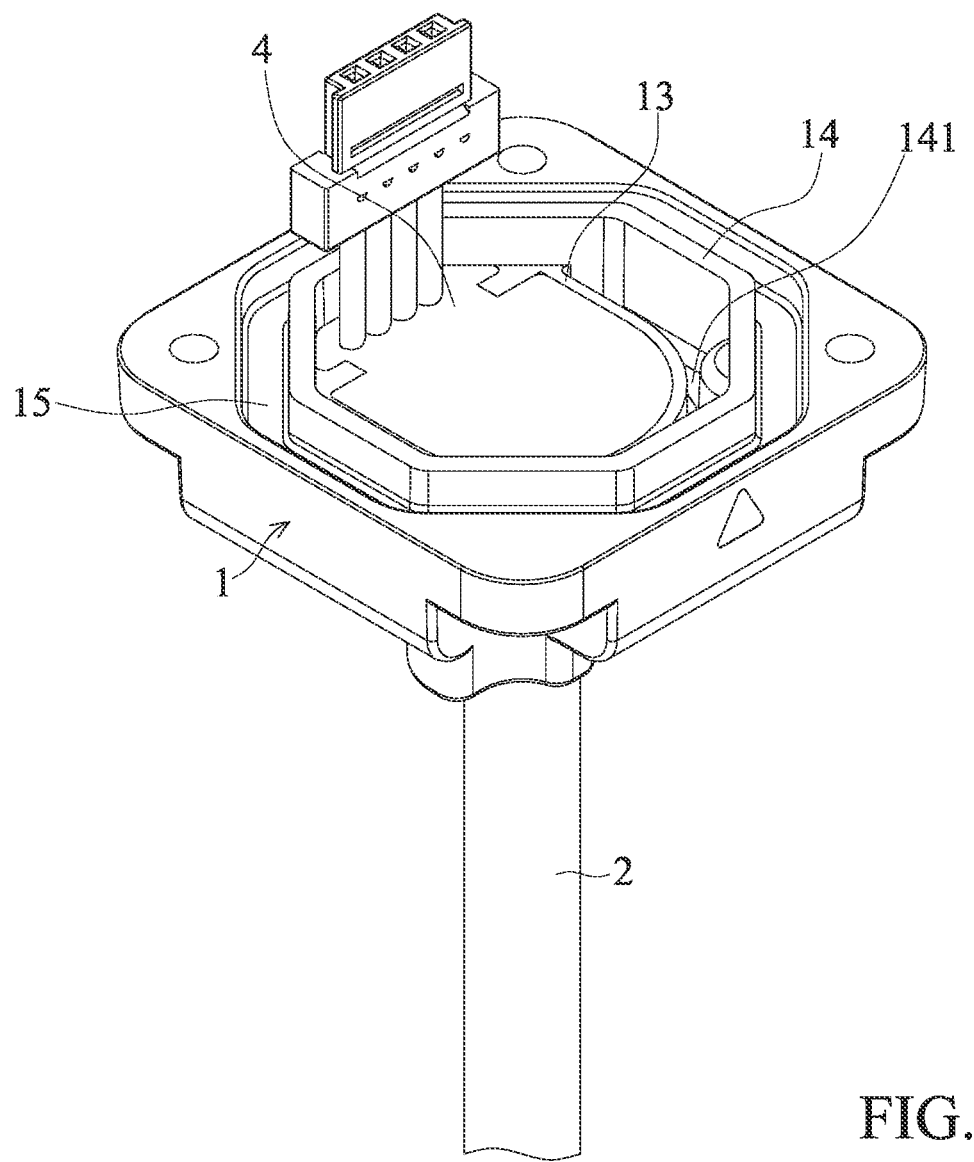
FIG. 4B shows the sealing material of the embodiment of the invention combined with the base.

FIG. 4A shows the restriction bushing of the embodiment of the invention combined with the base. FIG. 4B shows the sealing material of the embodiment of the invention combined with the base. With reference to FIGS. 3, 4A and 4B, in one embodiment, the base 1 comprises a first annular wall 13. The first annular wall 13 is formed on the base inner surface 12. The first annular wall 13 surrounds the restriction bushing 3. The first annular wall 13 defines a sealing recess 131. The sealing material 4 is filled into the sealing recess 131 defined by the first annular wall 13. The sealing material 4 can be thermal conductive glue, rubber or other sealing materials. The disclosure is not meant to restrict the invention. The sealing material 4 sufficiently contacts the inner side of the sealing recess 131, and fastens the positions of the restriction bushing 3 and the cable 2. The sealing material 4 therefore provides waterproof and dust-proof effects.

With reference to FIGS. 3, 4A and 4B, in one embodiment, the first annular wall 13 comprising a plurality of restriction notches 132. The cable 2 comprises a plurality of wires 21. The wires 21 are respectively restricted by the restriction notches 132. Utilizing the restriction notches 132, the wires 21 are arranged side by side. The sealing material 4 therefore sufficiently covers the wires 21 and the restriction notches 132 to provide improved waterproof and dust-proof effects.

With reference to FIGS. 3, 4A and 4B, in one embodiment, the base 1 comprises a second annular wall 14. The second annular wall 14 surrounds the first annular wall 13. A spacing recess 141 is formed between the first annular wall 13 and the second annular wall 14. Utilizing the spacing recess 141, the image capturing device has improved waterproof and dust-proof effects.

With reference to FIG. 3, relative to the bottom of the spacing recess 141, the first annular wall 13 has a first height h1, the second annular wall 14 has a second height h2, and the second height h2 is greater than the first height h1.

With reference to FIGS. 3, 4A and 4B, in one embodiment, the first annular wall 13 comprises a spacer section 133. The restriction notches 132 are formed on the spacer section 133. The two ends of the spacer section 133 are connected to the second annular wall 14. An extending recess 142 is formed between the spacer section 133 and the second annular wall 14. The extending recess 142 is held apart from the spacing recess 141 by the spacer section 133.

With reference to FIGS. 3, 4A and 4B, in one embodiment, the sealing material 4 extends from the sealing recess 131 into the extending recess 142. The sealing material 4 covers the restriction notches 132 and at least a portion of the wires 21. In this embodiment of the invention, the sealing material 4 extends from the sealing recess 131 into the extending recess 142, and the combination between the sealing material 4 and the base 1 is enhanced, and the positions of the restriction bushing 3 and the cable 2 can be firmly affixed.

Figure 5:
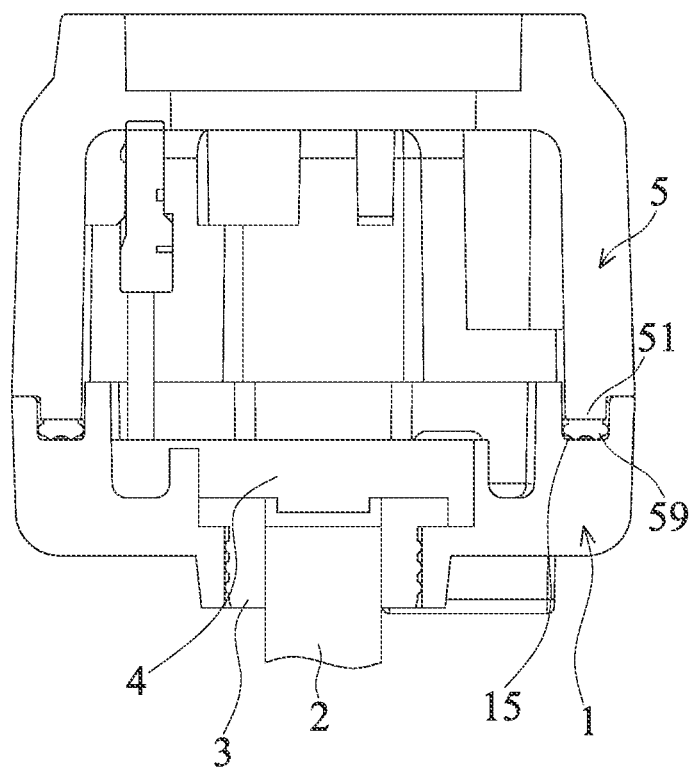
FIG. 5 is a cross-sectional view of a portion of the image capturing device of the embodiment of the invention.

FIG. 5 is a cross-sectional view of a portion of the image capturing device of the embodiment of the invention. With reference to FIGS. 1, 4B and 5, in one embodiment, the image capturing device C further comprises a housing 5, a sealing ring 59 and a lens 6. The lens 6 is connected to the housing 5. The housing 5 comprises a connection rib 51. The base 1 further comprises a connection groove 15. The connection groove 15 surrounds the second annular wall 14. The sealing ring 59 is disposed in the connection groove 15. The connection rib 51 is inserted into the connection groove 15. The sealing ring 59, the connection groove 15 and the connection rib 51 prevent water from entering the housing 5.

In one embodiment, the assembling process of the image capturing device includes the following steps. First, the restriction bushing is formed on the cable by injection molding. Then, the restriction bushing is tightly fitted to the base, and provides waterproof and dust-proof function (the first waterproof and dust-proof means). Next, the wires are restricted by the restriction notches to prevent air gap from being generated during the sealing material filling step. Then, the sealing material is filled to the base by the assistance of the mold. The sealing material provides waterproof and dust-proof function (the second waterproof and dust-proof means). In one embodiment, the curing condition of the sealing material is 40 min/50° C. The disclosure is not meant to restrict the invention.

In the image capturing device of the embodiment of the invention, the cable and the restriction bushing are affixed to the base. The restriction bushing is disposed on the inner side of the base. Compared to the conventional art, the size of the image capturing device is decreased. The image capturing device can be mounted to the environment with limited mounting space (for example, in the rear mirror of the vehicle). The sealing material further affixes the cable and the restriction bushing to prevent the cable and the restriction bushing from being separated from the base, and provides waterproof and dust-proof effects.

In the image capturing device of the embodiment of the invention, the usage of the conventional combination means (such and bolts and glue) is reduced. The housing of the embodiment of the invention can be separated from the base by external force, and the image capturing device can be reworked easily.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term).

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An image capturing device, comprising:
   a base, comprising a base through hole and a base inner surface, wherein the base through hole is formed on the base inner surface;
   a cable, passing through the base through hole;
   a restriction bushing, surrounding the cable, wherein the restriction bushing abuts the base inner surface, and is connected to the base through hole; and
   a sealing material, disposed in the base and covering the restriction bushing, wherein at least a portion of the cable is covered by the sealing material,
   wherein the base comprises a first annular wall, the first annular wall is formed on the base inner surface, the first annular wall surrounds the restriction bushing, the first annular wall defines a sealing recess, and the sealing material is filled into the sealing recess defined by the first annular wall,
   wherein the first annular wall comprises a plurality of restriction notches, the cable comprises a plurality of wires, and the wires are respectively restricted by the restriction notches.

2. The image capturing device as claimed in claim 1, wherein the restriction bushing comprises a bushing flange, and the bushing flange abuts the base inner surface.

3. The image capturing device as claimed in claim 1, wherein the restriction bushing comprises a plurality of bushing ribs, and the bushing ribs are fitted tightly with an inner wall of the base through hole.

4. The image capturing device as claimed in claim 1, wherein the base comprises a second annular wall, the second annular wall surrounds the first annular wall, and a spacing recess is formed between the first annular wall and the second annular wall.

5. The image capturing device as claimed in claim 4, wherein the first annular wall has a first height, the second annular wall has a second height, and the second height is greater than the first height.

6. The image capturing device as claimed in claim 4, wherein the first annular wall comprises a spacer section, the restriction notches are formed on the spacer section, and two ends of the spacer section are connected to the second annular wall.

7. The image capturing device as claimed in claim 6, wherein an extending recess is formed between the spacer section and the second annular wall, the extending recess is held apart from the spacing recess by the spacer section, the sealing material extends from the sealing recess into the extending recess, and the sealing material covers the restriction notches and at least a portion of the wires.

8. The image capturing device as claimed in claim 4, further comprising a housing, a sealing ring and a lens, wherein the lens is connected to the housing, the housing comprises a connection rib, the base further comprises a connection groove, the connection groove surrounds the second annular wall, the sealing ring is disposed in the connection groove, and the connection rib is inserted into the connection groove.

* * * * *